United States Patent
Andersen

(10) Patent No.: US 7,031,699 B1
(45) Date of Patent: Apr. 18, 2006

(54) SENDING INITIAL PASSWORD THROUGH AN SMS

(75) Inventor: Michael T. Andersen, Lyngby (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/049,591

(22) PCT Filed: Aug. 23, 1999

(86) PCT No.: PCT/EP99/06176

§ 371 (c)(1),
(2), (4) Date: May 8, 2002

(87) PCT Pub. No.: WO01/15462

PCT Pub. Date: Mar. 1, 2001

(30) Foreign Application Priority Data

Aug. 23, 1999 (WO) .................... PCT/EP99/06176

(51) Int. Cl.
*H04M 3/00* (2006.01)
(52) U.S. Cl. .................. 455/419; 455/418; 455/411; 455/466; 455/461; 379/15.02; 379/221.08; 379/201.03; 707/1; 707/10; 709/217; 709/219
(58) Field of Classification Search .............. 455/466, 455/411, 422.1, 432.3, 556.1, 557, 558; 380/247, 380/248, 271; 709/217, 219; 379/201.01, 379/201.02, 211.05
See application file for complete search history.

(56) References Cited

U.S. PATENT DOCUMENTS

| 5,577,103 A | 11/1996 | Foti .......................... 379/59 |
| 5,915,222 A * | 6/1999 | Olsson et al. ............... 455/466 |
| 5,915,225 A * | 6/1999 | Mills ......................... 455/558 |
| 5,956,636 A * | 9/1999 | Lipsit ........................ 455/411 |
| 6,119,014 A * | 9/2000 | Alperovich et al. ......... 455/466 |
| 6,230,002 B1 * | 5/2001 | Floden et al. ............... 455/411 |
| 6,556,820 B1 * | 4/2003 | Le et al. .................... 455/411 |
| 2002/0068554 A1 * | 6/2002 | Dusse ........................ 455/419 |

FOREIGN PATENT DOCUMENTS

| EP | 0 851 696 A2 | 7/1998 |
| EP | 0 944 203 A2 | 9/1999 |
| WO | WO 97/31306 | 8/1997 |
| WO | WO 98/41038 | 9/1998 |

* cited by examiner

*Primary Examiner*—Danh Cong Le
(74) *Attorney, Agent, or Firm*—Cohen, Pontani, Lieberman & Pavane

(57) ABSTRACT

The present invention discloses a services management method for managing subscriber services, comprising the steps of assigning an access code to a subscriber, encapsulating said access code into a data message, and transmitting said data message via a corresponding data channel of said network to a terminal (1) of said subscriber. By using this method, an access code like a password can be sent from a Service Management Access Point (SMAP) (6) to the terminal (1) of a subscriber via a data message such as a Short Message Service (SMS) message.

21 Claims, 2 Drawing Sheets

SENDING INITIAL PASSWORD THROUGH AN SMS

PRIORITY CLAIM

This is a national stage of PCT application No. PCT/EP99/06176, filed on Aug. 23, 1999. Priority is claimed on that application.

FIELD OF THE INVENTION

The present invention relates to a services management method for managing subscriber services and to a corresponding device, which serve in particular to supply a subscriber of services of a network with a password.

BACKGROUND OF THE INVENTION

There are a plurality of networks which offer special services for subscribers. An example for such networks is the so-called Intelligent Network (IN). The term Intelligent Network describes a network, in which new services can easily be introduced without the need to replace or upgrade switches or network control devices, including those under customer control.

In such an Intelligent Network, a subscriber or service provider can manage his own services by a network user interface. This management is handled by a so called Service Management Access Point (SMAP).

SMAP is an access system which provides the customers and service providers an open interface to different telecommunication network elements. They can update by using SMAP their service data in a secure and controlled manner on self-service basis in an intelligent network or other telecommunication network. A more detailed description of SMAP can be found in Nokia's patent application WO 98/41038.

In general, the communications between the subscriber and the SMAP have been handled so far by an Interactive Voice Prompt (IVR). This unit serves to collect information from a subscriber by outputting of voice messages which can be answered by the subscriber by operating keys or by predetermined spoken words.

The identification of the subscriber has been effected according to the Mobile Station Integrated Services Digital Network Number (MSISDN). The MSISDN is a permanent subscriber data stored in a Service Management Point (SMP).

Especially in such a network including IN services it is necessary to grant different access admissions to respective subscribers. That is, if a subscriber to IN services is given access to the SMAP over the network, he must be provided with a user identification (ID) and a password or some other kind of credential.

It is important to protect the service management by a password or the like since it has to be avoided that other parties than the subscriber can get access to secret data such as a phone bill or the like. Furthermore, the service provider should be enabled to prove that the subscriber can only get access to those services for which he has paid for.

Heretofore, the password which has been assigned to the corresponding subscriber has been sent to the subscriber by using paper mail, for example. This involves a lot of work for the staff of a service provider and/or network operator. Thus, it is very expensive to grant a huge number of passwords for a huge number of subscribers.

Therefore, the way of granting a password (or any other form or credential) according to this prior art as described above is complicated, troublesome and costly.

SUMMARY OF THE INVENTION

Thus, the object underlying the invention is to eliminate the above drawbacks of the prior art and to provide a method and an apparatus by which a password or different kinds of security code can be supplied to a subscriber in an uncomplicated manner.

This object is solved by a services management method for managing subscriber services, comprising the steps of assigning an access code to a subscriber, encapsulating the access code into a data message, and transmitting the data message via a corresponding data channel of the network to a terminal of the subscriber.

Furthermore, the above object is solved by a services management device for managing subscriber services, comprising an access granting means for assigning an access code to a subscriber, a message generating means for encapsulating the access code into a data message, and a transmitting means for transmitting the data message via a corresponding data channel of the network to a terminal of the subscriber.

By the above method, the delivery of an access code such as a password is performed by using an existing kind of data messages, for example, a Short Message Service (SMS) message. The method according to the invention can easily be performed in a Service Management Access Point (SMAP) without involving the staff of a IN service provider.

Thus, an uncomplicated handling regarding the provision of passwords to the subscribers is possible. Furthermore, it also very easy for the subscriber to use his password since it is sent to the mobile station which he uses for accessing the corresponding Intelligent Network.

Moreover, it is very easy to regularly change the password in order to provide a higher security when accessing the network. This is because new passwords can easily be sent by using the data channel. Sending passwords via paper mail during short intervals would be very complicated and troublesome for the staff of the IN services provider and also for the user.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The present invention will be more readily understood with reference to the accompanying drawings in which.

DETAILED DESCRIPTION OF PREFERRED EMBODIMENTS

In the following, a preferred embodiment of the invention is described in more detail with reference to the accompanying drawings.

Figure 1:
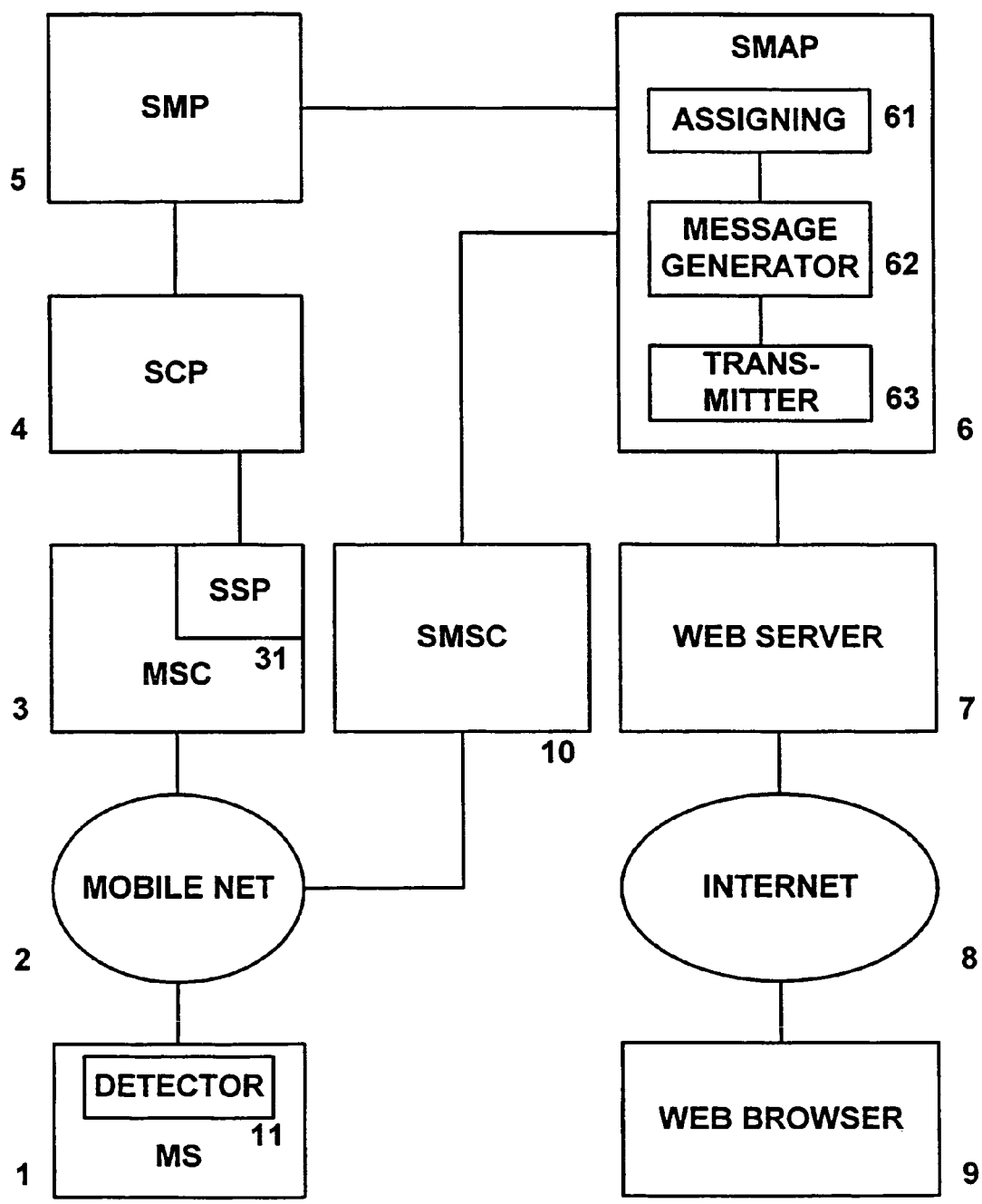
FIG. 1 shows a structure of a network including Intelligent Network (IN) services according to an embodiment of the invention, and FIG. 2 a flowchart of a process for delivering a password to a subscriber according to the embodiment of the invention.

FIG. 1 shows a structure of a general network system in which IN (Intelligent Network) services are provided. A user terminal which can be a mobile station (MS), for example, is denoted with reference numeral 1. This mobile station is connected via a mobile network 2 with a Mobile Services Switching Center (MSC) 3.

The MSC 3 comprises a Service Switching Point (SSP) 31 which implements a service switching function and which also provides an interface between a Services Control Point (SCP) 4 and the MSC 3. The SCP 4 serves to control the services requests etc. and is the function in the telecommunications network, which has access to data and logic for controlling processing of a call in order to provide a supplementary service. The SCP 4 is connected with a service management point (SMP) 5 in which IN services offered in the corresponding Intelligent Network are managed. In particular, also subscriber data such as an MSISDN (Mobile Station ISDN Number, i.e., Mobile Station Integrated Services Digital Network Number) are stored in the SMP 5.

Reference numeral 6 describes a Service Management Access Point (SMAP) connected to the SMP 5. The SMAP 6 serves to control access from a subscriber to the SMP 5.

Reference numeral 7 denotes a web server of an IN service provider. The web server 7 provides an interface between the subscriber terminal, i.e., a web browser 9 and the SMAP 6 via the Internet 8.

Reference numeral 10 denotes a Short Messages Service Center (SMSC) which controls the short messages and which provides a connection between the SMAP 6 and the MS 1 via the mobile network 2.

It is to be noted that for simplifying the description, all further elements necessary to establish the connection (e.g., base stations BS and base station controllers BSC) are omitted.

In general, when the subscriber grants access to the basic (call related) IN services, he does not have to provide a password. He is authenticated by the A-number (MSISDN). Only when services (or access to service management) are provided over another network (such as the Internet 8), another way to authenticate the subscriber has to be implemented.

That is, in order to get access to the IN services offered by the SMP to the subscriber via the Internet (by using his web browser 9), the subscriber must know his password and submit his password when requesting an IN service. Thus, initially, a password must be assigned to the subscriber and transmitted to the subscriber.

By using the password, the subscriber can establish a secure connection to the web-server 7 of the service provider. Furthermore, in case the security has been compromised (e.g., the password has become public), a new password can be issued.

It is to be noted that the password is only an example for an access code which is necessary for the subscriber to get access to the IN services. Such an access code can also include only a subscriber ID number or can include an MSISDN number and the password. Furthermore, other forms of credential can be included in the access code.

According to this embodiment, the transmission of the password from the SMAP 6 to the subscriber is effected by using a Short Message Service (SMS).

The Short Message Service (SMS) is a service which is implemented in almost all mobile stations. In general, SMS messages are utilized to communicate text data between a serving Mobile Services Switching Center (MSC) and a mobile station (MS). SMS provides a high degree of privacy compared to, e.g., e-mails. Thus, SMS is an appropriate medium to transmit passwords or the like.

Using SMS messages, the serving center or any other connected node can transmit user information to the mobile station and have the mobile station store the received user information. The SMS messages are transmitted via a Short Message Service Center (SMSC). Thus, the connection provided by the SMS is a data channel via which the data messages (SMS messages) containing the password are transmitted.

In the following, the elements necessary for the initial transmission of the password are described in more detail.

The SMAP 6 comprises an assigning means 61 which assigns a password to a subscriber. For example, this can be effected in response to a request for granting a password from the corresponding subscriber. As an alternative, the passwords for access to service management can also be given in a bulk to the subscribers. However, this can also be effected during predetermined intervals (e.g., once a week) such that the password is changed regularly in order to improve the security of the access of the subscriber.

The assigned password is supplied to a message generator 62. This message generator 62 is adapted to encapsulate the password into an SMS message.

The SMS message containing the password is then supplied to a transmitter 63. The transmitter 63 is adapted to transmit SMS messages via the Short Message Service Center (SMSC) 10. The SMSC 10 provides a connection between the SMAP 6 and the mobile station (MS) 1 of the subscriber via the mobile network 2. The MS 1 comprises a detector 11 which is adapted to receive the SMS message.

Figure 2:
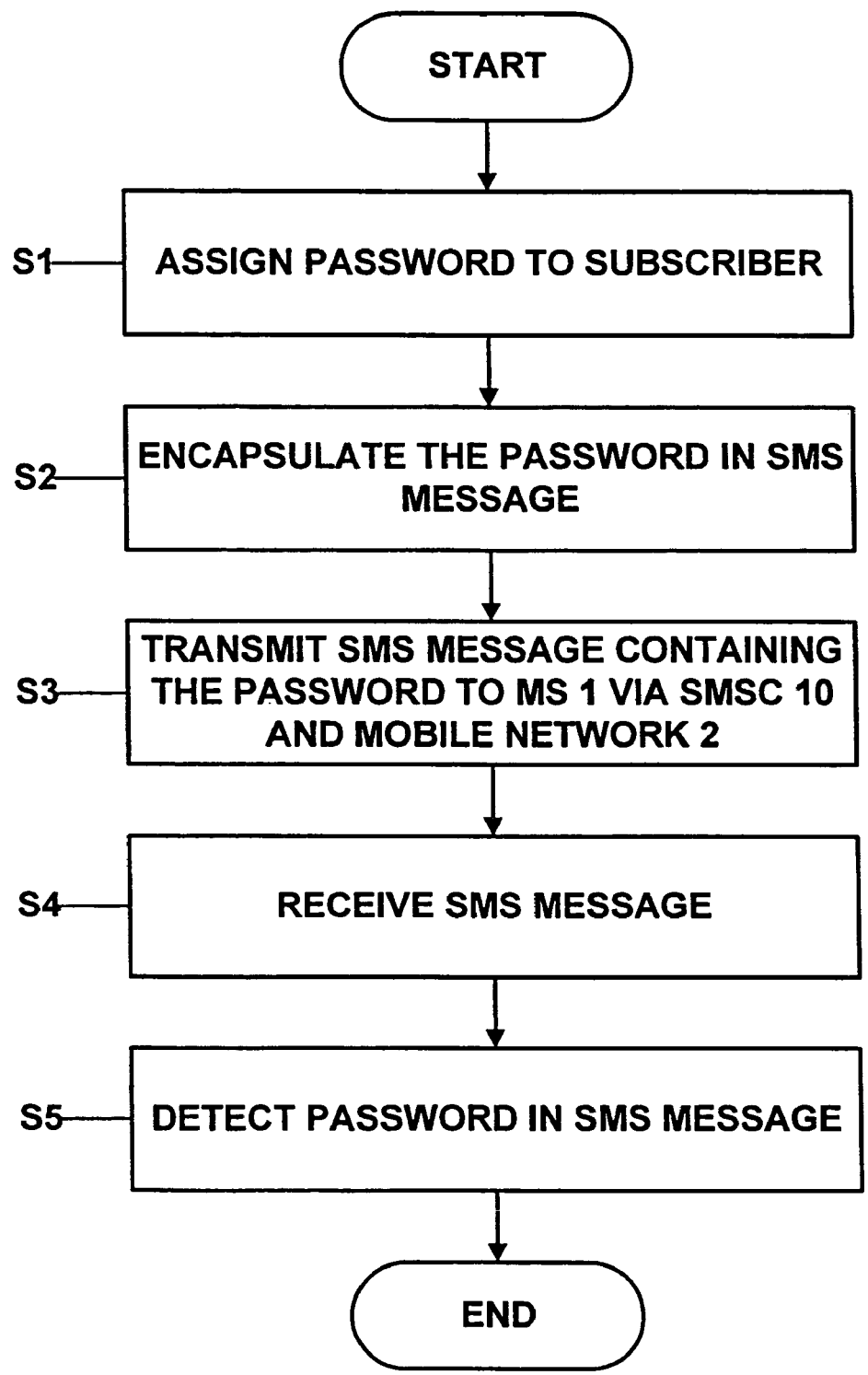

The method for transmitting the password performed in the above described devices is shown in the flowchart of FIG. 2.

Steps S1 to S3 are performed on the IN service management side (i.e., in the SMAP 6), whereas steps S4 to S5 are performed on the subscriber side (i.e., in the mobile station MS 1).

In step S1, the password is assigned to a subscriber. In step S2, the password is encapsulated in an SMS message. Then, the SMS message is transmitted to the mobile station via an SMS connection (SMS data channel), i.e., via the SMSC 10 and the mobile network 2.

In step S4, the SMS message is received by the mobile station. In step S5, the password is detected in the SMS message and shown on a display of the mobile station. Preferably, the password should not be automatically displayed but on demand of the subscriber, for example by operating a special key or inputting a special code for reading SMS messages. This measure avoids that other persons than the subscriber can accidentally read the password.

The above embodiment has been described such that the password is sent by using an SMS message. As an alternative of this embodiment, the password can also be transmitted by a so-called Unstructured Supplementary Service Data (USSD) message.

In general, using USSD messages, a mobile telecommunication network is able to transparently communicate text data with a mobile station. Hence, the mobile station may receive and display text messages on an attached display unit.

Thus, USSD messages are similar to SMS messages with respect to the capability of sending text data to a subscriber. Hence, also USSD messages can be used to transmit a password to the corresponding subscriber.

In case of using USSD messages instead of SMS messages, the message generator 62 and the transmitter 63 of the SMAP 6 and the SMSC 10 have to be correspondingly modified. In particular, the USSD message has to be transmitted via a USSD data channel.

It is to be noted that the above embodiment has been described with respect to a mobile telecommunication network (e.g., a GSM network). However, the invention can also be applied to fixed networks as long as the terminals are adapted to receive data messages such as SMS or USSD messages.

As described above, by using the method according to the invention, an access code like a password can be transmitted from a Service Management Access Point SMAP 6 to the terminal 4 of a subscriber via a data message such as a Short Message Service SMS message. Thus, a necessary password can easily be supplied to the subscriber without the need of complicated work of a staff of an IN service provider or the like. Furthermore, the method can easily be implemented, since almost all mobile stations support Short Message Service (SMS).

Thus, while there have been shown and described and pointed out fundamental novel features of the present invention as applied to preferred embodiments thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A services management method for managing subscriber services in an Intelligent Network, in which a subscriber or service provider can manage his own services, comprising the steps of:
   assigning an access code to a subscriber by which the subscriber is allowed to get access to services or to service management via the Internet;
   encapsulating said access code into a data message; and
   transmitting said data message via a corresponding data channel of said network to a terminal of said subscriber,
   wherein the assigning step and the encapsulating step are performed in a Service Management Access Point.

2. The services management method according to claim 1, wherein said access code comprises a password.

3. The services management method according to claim 2, wherein said access code comprises a subscriber identification number.

4. The services management method according to claim 2, further comprising the step of
   detecting said access code in said terminal of said subscriber.

5. The services management method according to claim 1, wherein said access code comprises a subscriber identification number.

6. The services management method according to claim 5, further comprising the step of detecting said access code in said terminal of said subscriber.

7. The services management method according to claim 1, wherein said data message is a Short Message Service (SMS) message.

8. The services management method according to claim 7, further comprising the step of detecting said access code in said terminal of said subscriber.

9. The services management method according to claim 1, wherein said data message is an Unstructured Supplementary Service Data (USSD) message.

10. The services management method according to claim 9, further comprising the step of detecting said access code in said terminal of said subscriber.

11. The services management method according to claim 1, further comprising the step of detecting said access code in said terminal of said subscriber.

12. A services management device for managing subscriber services in an Intelligent Network in which a subscriber or service provider can manage his own services, comprising:
   an access granting means for assigning an access code to a subscriber by which the subscriber is allowed to get access to services or to service management via the Internet;
   a message generating means for encapsulating said access code into a data message; and
   a transmitting means for transmitting said data message via a corresponding data channel of said network to a terminal of said subscriber,
   wherein the services management device is a Service Management Access Point.

13. The services management device according to claim 12, wherein said access code comprises a password.

14. The services management method according to claim 13, wherein said access code comprises a subscriber identification number.

15. The services management method according to claim 12, wherein said access code comprises a subscriber identification number.

16. A subscriber terminal which is adapted to receive data messages transmitted by a services management device according to claim 15, further comprising a detecting means for detecting said access code.

17. The services management device according to claim 12, wherein said data message is a Short Message Service (SMS) message.

18. A subscriber terminal which is adapted to receive data messages transmitted by a services management device according to claim 17, further comprising a detecting means for detecting said access code.

19. The services management device according to claim 12, wherein said data message is an Unstructured Supplementary Service Data (USSD) message.

20. A subscriber terminal which is adapted to receive data messages transmitted by a services management device according to claim 13, further comprising a detecting means for detecting said access code.

21. A subscriber terminal which is adapted to receive data messages transmitted by a services management device according to claim 19, further comprising a detecting means for detecting said access code.

* * * * *